US010425375B2

(12) United States Patent
Chen

(10) Patent No.: US 10,425,375 B2
(45) Date of Patent: Sep. 24, 2019

(54) MESSAGE SENDING METHOD, APPARATUS, AND SYSTEM, AND SERVER

(71) Applicant: Tencent Technology (Shenzhen) Company Limited, Shenzhen (CN)

(72) Inventor: Hao Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 212 days.

(21) Appl. No.: 15/629,572

(22) Filed: Jun. 21, 2017

(65) Prior Publication Data
US 2017/0317962 A1 Nov. 2, 2017

Related U.S. Application Data

(63) Continuation of application No. PCT/CN2016/072138, filed on Jan. 26, 2016.

(30) Foreign Application Priority Data

Feb. 13, 2015 (CN) .......................... 2015 1 0080523

(51) Int. Cl.
*H04L 12/58* (2006.01)
*H04L 29/08* (2006.01)
*H04L 29/12* (2006.01)

(52) U.S. Cl.
CPC .............. *H04L 51/28* (2013.01); *H04L 51/00* (2013.01); *H04L 51/10* (2013.01); *H04L 51/14* (2013.01);
(Continued)

(58) Field of Classification Search
CPC ......... H04L 51/28; H04L 51/00; H04L 51/10; H04L 51/14; H04L 51/32; H04L 51/34; H04L 61/2069; H04L 67/306; H04L 67/26
(Continued)

(56) References Cited

U.S. PATENT DOCUMENTS

2008/0109519 A1* 5/2008 Aaltonen ................ H04L 51/38
709/206
2013/0282838 A1 10/2013 Zhu
(Continued)

FOREIGN PATENT DOCUMENTS

CN 101997984 A 3/2011
CN 102118854 A 7/2011
(Continued)

OTHER PUBLICATIONS

Tencent Technology, ISRWO, PCT/CN2016/072138, dated Mar. 24, 2016, 8 pgs.
Tencent Technology, IPRP, PCT/CN2016/072138, dated Aug. 15, 2017, 7 pgs.

*Primary Examiner* — Tu T Nguyen
(74) *Attorney, Agent, or Firm* — Morgan, Lewis & Bockius LLP

(57) ABSTRACT

A method for delivering messages performed at a server includes: generating a group-sending interface invocation request, and sending the group-sending interface invocation request to an open platform server, where the group-sending interface invocation request carries a to-be-sent message and at least one group identifier, a follower group corresponding to each group identifier includes a user account of at least one follower of a target user account, the target user account is a user account that a service provider applies for to the social networking application, the group-sending interface invocation request is used to invoke a message group-
(Continued)

sending interface provided by the open platform server, and the message group-sending interface is configured to send a message to a client terminal corresponding to a user account in a follower group corresponding to each of the at least one group identifier.

17 Claims, 9 Drawing Sheets

(52) U.S. Cl.
CPC .............. *H04L 51/32* (2013.01); *H04L 51/34* (2013.01); *H04L 61/2069* (2013.01); *H04L 67/306* (2013.01); *H04L 67/36* (2013.01)

(58) Field of Classification Search
USPC ........................................................ 709/206
See application file for complete search history.

(56) References Cited

U.S. PATENT DOCUMENTS

| | | | | |
|---|---|---|---|---|
| 2014/0369251 | A1* | 12/2014 | Zhang | H04W 4/08 370/312 |
| 2015/0215671 | A1* | 7/2015 | Lewis | H04L 65/602 725/131 |

FOREIGN PATENT DOCUMENTS

| | | |
|---|---|---|
| CN | 102176705 A | 9/2011 |
| CN | 102801657 A | 11/2012 |
| CN | 103024136 A | 4/2013 |
| CN | 103491083 A | 1/2014 |
| CN | 103778260 A | 5/2014 |
| CN | 104023020 A | 9/2014 |
| CN | 104050589 A | 9/2014 |
| CN | 104717132 A | 6/2015 |

* cited by examiner

MESSAGE SENDING METHOD, APPARATUS, AND SYSTEM, AND SERVER

PRIORITY CLAIM AND RELATED APPLICATION

This application is a continuation application of PCT Patent Application No. PCT/CN2016/072138, entitled "MESSAGE SENDING METHOD, APPARATUS, AND SYSTEM, AND SERVER" filed on Jan. 26, 2016, which claims priority to Chinese Patent Application No. 201510080523.6, entitled "MESSAGE SENDING METHOD, APPARATUS, AND SYSTEM, AND SERVER" filed on Feb. 13, 2015, both of which are incorporated by reference in their entirety.

FIELD OF THE TECHNOLOGY

Embodiments of the present application relates to the field of open platforms, and in particular, to a message sending method, apparatus, and system, and a server.

BACKGROUND OF THE DISCLOSURE

Common users and operators may all apply for user accounts in a social networking application system. The operators may provide services, such as querying, notification, consulting, and a customer service, to the common users by using the social networking application system.

In a related technology, a social networking application system may provide an open platform for a service provider, and a user account that the operator applies for may be referred to as a public account. After following, in a social networking application, the public account that the operator applies for, a common user can become a follower of the public account. The operator can send a message to the follower by using an open platform. Specifically, the operator generates a message sending request by using a third-party server, and sends the message sending request to the open platform. The message sending request carries a to-be-sent message and a user account of at least one follower. Correspondingly, after receiving the message sending request, the open platform reads the user account carried in the message sending request, and forwards the foregoing message to a client terminal corresponding to the user account.

During implementation of embodiments of the present application, it was found that the related technology has at least the following problem: When a service provider needs to send a message to multiple followers, the operator needs to add user accounts of the multiple followers to a message sending request one by one, resulting in complex operations and affecting message sending efficiency.

SUMMARY

To resolve a problem, which exists when a message is sent by using a related technology, of complex operations and low message sending efficiency, embodiments of the present application provide a method, an apparatus, and a message sending system, and a server. Technical solutions are as follows:

According to a first aspect, a message sending method is provided, the method including:

generating a group-sending interface invocation request, the group-sending interface invocation request carrying a to-be-sent message and at least one group identifier, a follower group corresponding to each group identifier including a user account of at least one follower of a target user account, the target user account being a user account that a service provider applies for to the social networking application, the group-sending interface invocation request being used to invoke a message group-sending interface provided by the open platform server, and the message group-sending interface being used to send the message to a client terminal corresponding to a user account in a follower group corresponding to each of the at least one group identifier; and sending the group-sending interface invocation request to the open platform server.

According to a second aspect, a message sending method is provided, the method including:

receiving a group-sending interface invocation request sent by a target user account, the group-sending interface invocation request carrying a to-be-sent message and at least one group identifier, a follower group corresponding to each group identifier including a user account of at least one follower of the target user account, and the target user account being a user account that a service provider applies for to the social networking application; and invoking, according to the group-sending interface invocation request, a message group-sending interface to send the message to a client terminal corresponding to a user account in a follower group corresponding to each of the at least one group identifier.

According to a third aspect, a message sending apparatus is provided, applied to a third-party server, and the apparatus including:

a first generation module, configured to generate a group-sending interface invocation request, the group-sending interface invocation request carrying a to-be-sent message and at least one group identifier, a follower group corresponding to each group identifier including a user account of at least one follower of a target user account, the target user account being a user account that a service provider applies for to the social networking application, the group-sending interface invocation request being used to invoke a message group-sending interface provided by the open platform server, and the message group-sending interface being used to send the message to a client terminal corresponding to a user account in a follower group corresponding to each of the at least one group identifier; and a first sending module, configured to send the group-sending interface invocation request to the open platform server.

According to a fourth aspect, a message sending apparatus is provided, applied to an open platform server, and the apparatus including:

a first receiving module, configured to receive a group-sending interface invocation request sent by a target user account, the group-sending interface invocation request carrying a to-be-sent message and at least one group identifier, a follower group corresponding to each group identifier including a user account of at least one follower of the target user account, and the target user account being a user account that a service provider applies for to the social networking application; and a first invocation module, configured to invoke, according to the group-sending interface invocation request, a message group-sending interface to send the message to a client terminal corresponding to a user account in a follower group corresponding to each of the at least one group identifier.

According to a fifth aspect, a message sending system is provided, the system including a third-party server and an open platform server;

the third-party server including the message sending apparatus described in the third aspect; and the open platform server including the message sending apparatus described in the fourth aspect.

According to a sixth aspect, a third-party server is provided, the third-party server including a processor and a memory, the memory storing a set of program code, and the processor being configured to invoke the program code stored in the memory, to perform the following operations:

generating a group-sending interface invocation request, the group-sending interface invocation request carrying a to-be-sent message and at least one group identifier, a follower group corresponding to each group identifier including a user account of at least one follower of a target user account, the target user account being a user account that a service provider applies for to the social networking application, the group-sending interface invocation request being used to invoke a message group-sending interface provided by the open platform server, and the message group-sending interface being used to send the message to a client terminal corresponding to a user account in a follower group corresponding to each of the at least one group identifier; and sending the group-sending interface invocation request to the open platform server.

According to a seventh aspect, an open platform server is provided, the open platform server including a processor and a memory, the memory storing a set of program code, and the processor being configured to invoke the program code stored in the memory, to perform the following operations:

receiving a group-sending interface invocation request sent by a target user account, the group-sending interface invocation request carrying a to-be-sent message and at least one group identifier, a follower group corresponding to each group identifier including a user account of at least one follower of the target user account, and the target user account being a user account that a service provider applies for to the social networking application; and invoking, according to the group-sending interface invocation request, a message group-sending interface to send the message to a client terminal corresponding to a user account in a follower group corresponding to each of the at least one group identifier.

The technical solutions provided in the embodiments of the present application have the following beneficial effects:

A group-sending interface invocation request carrying a to-be-sent message and at least one group identifier is generated, the group-sending interface invocation request is sent to an open platform server, and a message group-sending interface is invoked to send a message to a client terminal corresponding to a user account in a follower group corresponding to each of the at least one group identifier. In this way, a problem, which exists when a message is sent by using a related technology, of complex operations and low message sending efficiency is resolved. As long as a service provider adds group identifiers of one or multiple follower groups to an interface invocation request, the operator can group-send a message to followers in the one or more follower groups, instead of adding user accounts of the followers one by one, achieving effects of simplifying the operations and improving the message sending efficiency.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following descriptions show merely some embodiments of the present application, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the implementation manners of the present disclosure in detail with reference to the accompanying drawings.

First, some nouns involved in the embodiments of the present application are defined and described.

1. A user account refers to an account that a service provider applies for on an open platform. The foregoing operator generally refers to an organization or an individual, such as a merchant, an enterprise, a government, media, or a celebrity, that is relatively highly focused by a user. This type of user account may also be referred to as a public account.

2. An operator refers to an owner of a user account, that is, an organization or an individual that applies for the foregoing user account, and also refers to a public account operator.

3. An open platform refers to a platform that provides an interface to a third-party server based on an original software system, and that enhances a function of the original software system by means of access of the third-party server or uses a resource of the original software system. The open platform is, for example, a WeChat public platform, an Alipay service window platform, or a Baidu connect open platform. The original software system may be a social networking application system, a payment application system, or another related application system. Using the social networking application system as an example, after a service provider applies for a user account on an open platform in the social networking application system, a common user in the social networking application system may follow the user account, or establish a friend relationship with the user account. Then, the common user and the operator may perform information interaction of a text, an image, a voice, a video, and the like by using the social networking application system as a medium.

Figure 1:
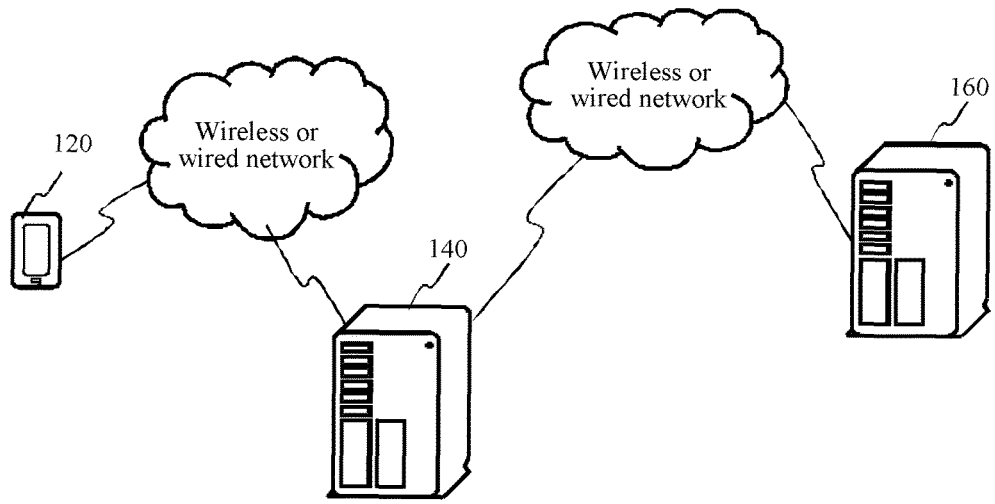
FIG. 1 is a schematic structural diagram of an implementation environment involved in an embodiment of the present application.

Referring to FIG. 1, FIG. 1 is a schematic structural diagram of an implementation environment involved in an embodiment of the present application. The implementation environment includes: a terminal 120, an open platform server 140, and a third-party server 160.

The terminal 120 is an electronic device, such as a smartphone, a tablet computer, or a desktop computer, that is used by a common user, and a client corresponding to the open platform server 140 runs in the terminal 120. When an example in which the original software system is a social networking application system is mainly used in the specification, the client may be a social networking application client, for example, a WeChat client.

The client is connected to the open platform server 140 by using a wired network or a wireless network.

The open platform server 140 may be one server, may be a server cluster including multiple servers, or may be a cloud computing service center. The open platform server 140 is configured to provide an interface to the third-party server 160 based on the original software system. For example, the open platform server 140 may provide an interface to the third-party server 160 based on the social networking application system. For example, the open platform server 140 may provide an interface to the third-party server 160 based on a WeChat system, to enhance a function of the WeChat system or to use a resource of the WeChat system.

The open platform server 140 is connected to the third-party server 160 by using a wired network or a wireless network.

The third-party server 160 may be one server, may be a server cluster including multiple servers, or may be a cloud computing service center.

In a possible implementation manner, the third-party server 160 may be a background server that is configured by a service provider to provide services to a follower of a public account, and the open platform server 140 may be an public platform server that can be accessed by different third-party servers 160.

It should be noted that, "a third party" in the "third-party server" involved in this embodiment of the present application is relative to "the open platform server", and it does not mean that the "third-party server" and the "open platform server" are bound to belong to different owners. Alternatively, the "third-party server" and the "open platform server" may belong to different servers of a same owner.

In this embodiment of the present application, the open platform server 140 provides a message group-sending interface to the third-party server 160, and the third-party server 160 sends a message to a follower of a target user account by invoking the message group-sending interface. The target user account is a user account that the operator applies for in the open platform server 140.

Figure 2:
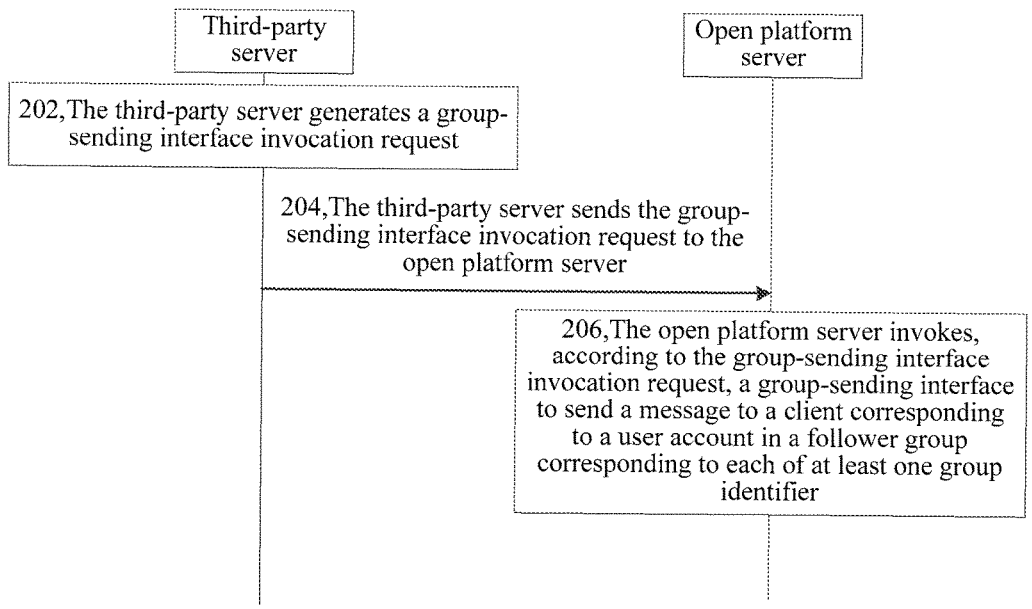
FIG. 2 is a method flowchart of a message sending method according to an embodiment of the present application.

Referring to FIG. 2, FIG. 2 is a method flowchart of a message sending method according to an embodiment of the present application. This embodiment is described by using an example in which the message sending method is applied to the implementation environment shown in FIG. 1. The message sending method may include the following several steps.

Step 202: A third-party server generates a group-sending interface invocation request.

The group-sending interface invocation request carries a to-be-sent message and at least one group identifier. The group-sending interface invocation request is used to invoke a message group-sending interface provided by the open platform server, and the message group-sending interface is used to send a message to a client terminal corresponding to a user account in a follower group corresponding to each of the at least one group identifier.

A message type of the message includes, but is not limited to, any one of a text message, an image-text message, a voice message, a music message, an image message, and a video message.

A follower group corresponding to each group identifier includes a user account of at least one follower of a target user account, and the target user account is a user account that a service provider applies for in the open platform server. The operator may perform group management on followers in the following two possible implementation manners. In a possible implementation manner, the open platform server may provide a group management interface to the third-party server, and the group management interface is configured to perform a group management operation on the user account of the follower of the target user account. The foregoing group management interface includes, but is not limited to, at least one of a group creating interface, a group deletion interface, a group query interface, an interface for querying for a group in which a follower is, a group name modification interface, an interface of a group in which a mobile follower is, and a name remark setting interface. Correspondingly, the group management operation includes, but is not limited to, at least one of a group creating operation, a group deletion operation, a group query operation, an operation for querying for a group in which a follower is, a group name modification operation, an operation of a group in which a mobile follower is, and a name remark setting operation. In another possible implementation manner, the third-party server may also directly log on to the open platform server, and perform various group management operations by using a visual interface provided by the open platform server.

When needing to send a message to a follower in a follower group, the operator needs to add a group identifier of only the follower group to an interface invocation request, instead of adding user accounts of followers in the follower group one by one, thereby simplifying operations, and improving message sending efficiency.

In some implementations, the group-sending interface invocation request further carries an interface address of the message group-sending interface, and the interface address is used to instruct the open platform server to invoke the message group-sending interface.

In addition, a request protocol used by the group-sending interface invocation request may be the Hypertext Transfer Protocol (HTTP), or may be the Hypertext Transfer Protocol over Secure Socket Layer (HTTPS), or may be another user-defined protocol. A request manner used by the group-sending interface invocation request may be a POST request manner.

For example, using an example in which the request protocol used by the group-sending interface invocation request is the HTTPS, the request manner is the POST request manner, and a to-be-sent message is a text message, a request example of the group-sending interface invocation request is as follows: https://api.xxxxx.com/cgi-bin/message/mass/sendall, and an example of POST data carried in the group-sending interface invocation request is as follows:

```
{
"filter":{
"is_to_all":false
"group_id":"2"
},
"text":{
"content":"CONTENT"
},
"msgtype":"text"
}
```

Descriptions of parameters in the group-sending interface invocation request are shown in the following Table 1.

TABLE 1

| Parameter | Description |
| --- | --- |
| is_to_all | The parameter is used to set whether sending is performed to all followers, a value is true or false, selecting true indicates that sending is performed to all the followers, and selecting false indicates that sending can be performed to a follower in a designated follower group according to group_id |
| group_id | Group identifier |
| text | Indicate a text message |
| content | Content of the text message |
| msgtype | The parameter indicates a message type, a message type of a text message is a text, a message type of an image-text is mpnews, a message type of a voice message is a voice, a message type of a music message is music, a message type of an image message is an image, and a message type of a video message is a video |

Step 204: The third-party server sends the group-sending interface invocation request to the open platform server.

Correspondingly, the open platform server receives the group-sending interface invocation request sent by the third-party server.

Step 206: The open platform server invokes, according to the group-sending interface invocation request, a message group-sending interface to send the message to a client terminal corresponding to a user account in a follower group corresponding to each of the at least one group identifier.

After receiving the group-sending interface invocation request, the open platform server invokes the message group-sending interface. In some implementations, when the group-sending interface invocation request carries an interface address of the message group-sending interface (that is, the foregoing enumerated api.xxxxx.com/cgi-bin/message/mass/sendall), the open platform server invokes the message group-sending interface according to the interface address. Then, the open platform server obtains, according to a prestored correspondence, a user account of a follower corresponding to a group identifier, and then separately sends a message to a client corresponding to each user account.

In some implementations, the open platform server, with express or implicit permission by a user account's owner, analyzes the user activities of the user account of the social networking application (e.g., the number of messages submitted by the user account each day and at what time of the day, how often the user account checks messages from the target user account, a pattern by the user account on how to respond to a message from the target user account such as deleting the message, forwarding the message to another user account of the social networking application or replying to the target account with another message, etc.). Through analyzing the user activities of individual user accounts within the follower group as well as other demographic information like age, gender, educational level, etc., the open platform server generates a user profile for each user account to characterize the user account's relationship with the target user as an active follower, an occasional follower, or a dormant follower. The user profile of a user account also includes information like the geographical location of a client terminal from which the user account accesses the social networking application, the time zone information of the client terminal, the most likely time window during which the user account checks messages from the target user account. Based on such information, the open platform server compiles a set of message delivery parameters for a follower group of a target account that is customized for the user accounts within the follower group. For example, the set of message delivery parameters includes a location-based message delivery parameter for determining a message delivering schedule based on a physical location of a client terminal corresponding to a user account in a follower group, a time-based message delivery parameter for determining a message delivering schedule based on a time zone of a client terminal corresponding to a user account in a follower group, etc.

In some implementations, before invoking the message group-sending interface, the open platform server obtains a sets of message delivery parameters corresponding to a respective follower group of the target user account. Next, the open platform server determines a message delivery schedule for each client terminal corresponding to a user account in a respective follower group according to the set of message delivery parameters of the follower group and a user profile of the user account. According to the delivery schedule, the open platform server delivers messages from the target user to each user account of a follower group, which not only increases the chance of the following user account checking the messages from the target user account but also avoids wasting network bandwidth on sending messages to those occasional or dormant followers in a time window when there is low chance that these messages will be checked while there is a competing need for such network bandwidth by other programs running at the open platform server or other user accounts of the social networking application running at the open platform server. In yet another example, the set of message delivery parameters can be further granulated by being divided into a subset of group-level message delivery parameters, multiple subsets of subgroup-level message delivery parameters, and individual user account-level message delivery parameters. This granulation of message delivery parameters often involves the analysis of user profiles of user accounts within a follower group such that user accounts sharing similar user profiles may be grouped into a subgroup and receive new messages from the open platform server around the same time window.

In some implementations, after succeeding in invoking the message group-sending interface to execute a group-sending task, the open platform server may generate a message identifier corresponding to the message, and send the message identifier to the third-party server. The third-party server may perform a management operation on the foregoing message by using the message identifier, for example, deleting the message or querying for a sending status of the message.

In some implementations, after succeeding in invoking the message group-sending interface to execute the group-sending task, the open platform server may return a success indication to the third-party server. Alternatively, after failing to invoke the message group-sending interface to execute the group-sending task, the open platform server may return a failure indication to the third-party server. The failure indication may carry an error code and/or error information, so that the operator learns a processing failure reason according to the error code and/or the error information.

It should be noted that, that the open platform server returns the success indication to the third-party server only indicates that a group-sending task requested by the third-party server is already received and processed, and does not mean that the group-sending task is already completed (that is, does not mean that sending a message to each client is already completed). Therefore, it is still possible that occurrence of an exception in a subsequent sending process causes a failure of a follower to receive the message, and the exception is, for example, that a message is not successfully audited, a server is unstable, or a user account is abnormal.

It should be further noted that the foregoing step 202 and step 204 may be independently implemented as a message sending method on a side of the third-party server, and the foregoing step 206 may be independently implemented as the message sending method on a side of the open platform server.

It should be further noted that this embodiment is described only by using an example in which a service provider of the target user account interacts with the open platform server by using the third-party server. In another possible implementation manner, the operator of the target user account may also interact with the open platform server by using a client program. Alternatively, the operator of the target user account may further log on to the third-party server by using the client program, and control, by using the client program, the third-party server to interact with the open platform server. This is not limited in this embodiment.

To sum up, by means of the message sending method provided in this embodiment, a third-party server generates a group-sending interface invocation request carrying a to-be-sent message and at least one group identifier, sends the group-sending interface invocation request to an open platform server, and invokes a message group-sending interface to send the message to a client terminal corresponding to a user account in a follower group corresponding to each of the at least one group identifier. In this way, a problem, which exists when a message is sent by using a related technology, of complex operations and low message sending efficiency is resolved. As long as a service provider adds group identifiers of one or multiple follower groups to an interface invocation request, the operator can group-send a message to followers in the one or more follower groups, instead of adding user accounts of the followers one by one, achieving effects of simplifying the operations and improving the message sending efficiency.

Figure 3:
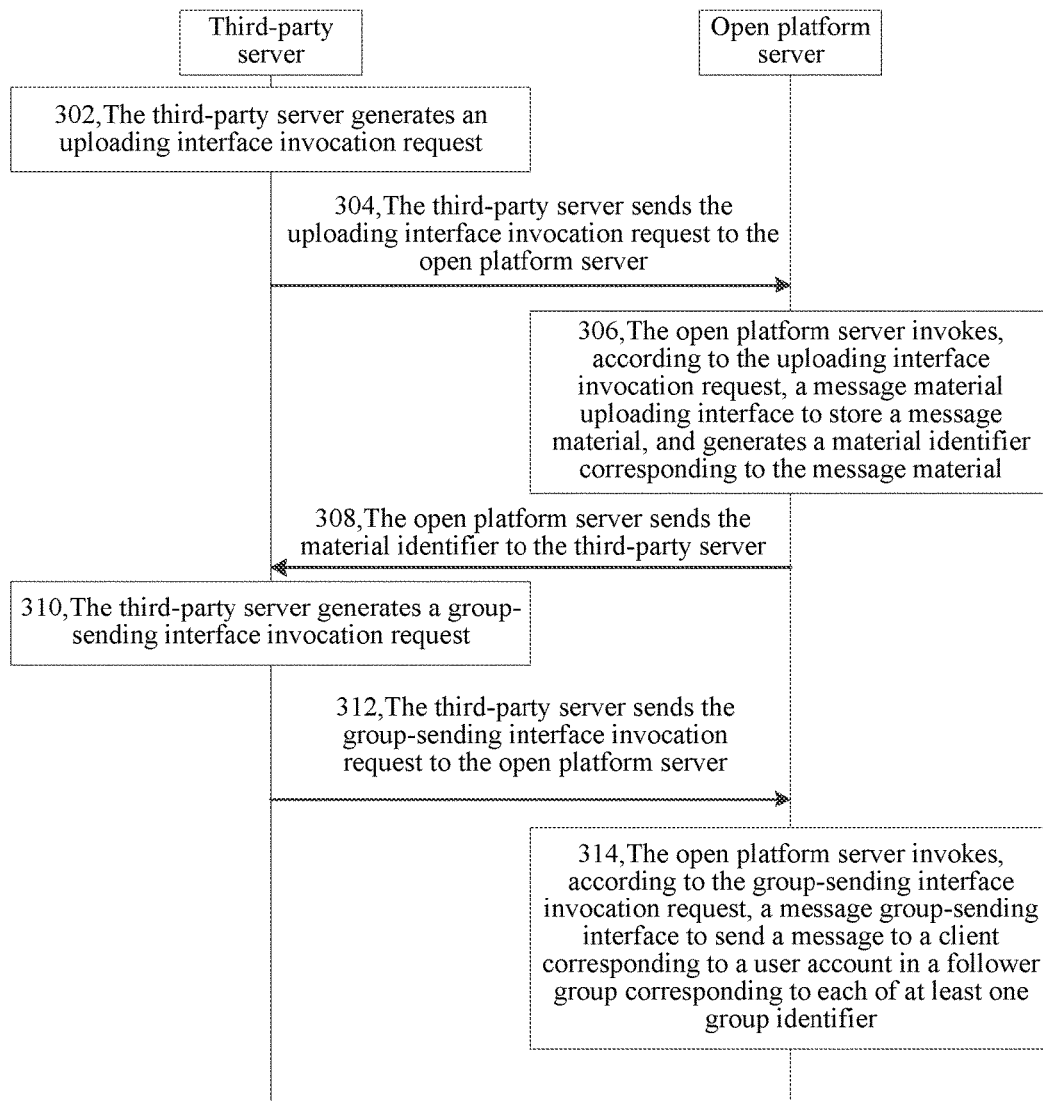
FIG. 3 is a method flowchart of a message sending method according to another embodiment of the present application.

Referring to FIG. 3, FIG. 3 is a method flowchart of a message sending method according to another embodiment of the present application. This embodiment is described by using an example in which the message sending method is applied to the implementation environment shown in FIG. 1. The message sending method may include the following several steps.

Step 302: A third-party server generates an uploading interface invocation request.

The uploading interface invocation request carries a message content to be uploaded, and the message content includes any one of an image-text message content, a voice message content, a music message content, an image message content, and a video message content. The uploading interface invocation request is used to invoke a message content uploading interface provided by the open platform server, and the message content uploading interface is configured to store the message content.

In some implementations, the uploading interface invocation request may further carry an interface address of the message content uploading interface, and the interface address is used to instruct the open platform server to invoke the message content uploading interface.

In addition, a request protocol used by the uploading interface invocation request may be the HTTP, or may be the HTTPS, or may be another user-defined protocol. A request manner used by the uploading interface invocation request may be a POST request manner.

For example, using an example of uploading an image-text message content, a request example of the uploading interface invocation request is as follows: https://api.xxxxx.com/cgi-bin/media/uploadnews, and an example of POST data carried in the uploading interface invocation request is as follows:

```
{
    "articles": [
        {
            "thumb_media_id":"qI6_Ze_6PtV7svjolgs-rN6stStuHIjs9_DidOHaj0Q-mwvBelOXCFZiq2OsIU-p",
            "author":"xxx",
                "title":"Happy Day",
                "content_source_url":"www.xxxx.com",
                "content":"content",
                "digest":"digest",
        "show_cover_pic":"1"
        },
        {
            "thumb_media_id":"qI6_Ze_6PtV7svjolgs-rN6stStuHIjs9_DidOHaj0Q-mwvBelOXCFZiq2OsIU-p",
            "author":"xxx",
                "title": "Happy Day",
                "content_source_url":"www.xxxx.com",
                "content":"content",
                "digest":"digest",
        "show_cover_pic":"0"
        }
    ]
}
```

Descriptions of parameters in the uploading interface invocation request are shown in the following Table 2.

TABLE 2

| Parameter | Description |
| --- | --- |
| articles | The parameter indicates an image-text message, and one image-text message includes at least one image-text (the foregoing request includes two image-texts) |
| thumb_media_id | A message content identifier of a thumbnail in an image-text, which can be obtained after the thumbnail is uploaded |
| author | Author of an image-text message |
| title | Title of an image-text message |
| content_source_url | Page displayed after an image-text message is clicked |

TABLE 2-continued

| Parameter | Description |
| --- | --- |
| content | Page content, which supports an HTML label |
| digest | Descriptions of an image-text message |
| show_cover_pic | The parameter is used to indicate whether a cover is displayed, 1 indicates displaying, and 0 indicates not displaying |

It should be noted that the parameters shown in Table 2 are exemplary, and in an actual application, a related necessary parameter may be configured in the uploading interface invocation request according to regulations of an open platform.

Step 304: The third-party server sends the uploading interface invocation request to the open platform server.

Correspondingly, the open platform server receives the uploading interface invocation request sent by the third-party server.

Step 306: The open platform server invokes, according to the uploading interface invocation request, a message content uploading interface to store the message content, and generates a message content identifier corresponding to the message content.

After receiving the uploading interface invocation request, the open platform server invokes the message content uploading interface. In some implementations, when the uploading interface invocation request carries an interface address of the message content uploading interface (that is, the foregoing enumerated api.xxxxx.com/cgi-bin/media/uploadnews), the open platform server invokes the message content uploading interface according to the interface address. Then, the open platform server stores the message content, and generates the message content identifier corresponding to the message content. Different message contents correspond to different message content identifiers, and the open platform server simultaneously stores the message content, the message content identifier, and a correspondence between the message content and the message content identifier.

Step 308: The open platform server sends the message content identifier to the third-party server.

Correspondingly, the third-party server receives the message content identifier that is sent by the open platform server and that corresponds to the message content.

Step 310: The third-party server generates a group-sending interface invocation request.

The group-sending interface invocation request carries a to-be-sent message and at least one group identifier. When a message type of the message is any one of an image-text message, a voice message, a music message, an image message, and a video message, the message includes the message content identifier corresponding to the message content. The third-party server may upload the message content to the open platform server in advance by using the foregoing step 302 to step 308, and obtain the corresponding message content identifier. When the message is group-sent, the message content identifier is added to the group-sending interface invocation request.

For example, using an example in which the request protocol used by the group-sending interface invocation request is the HTTPS, the request manner is the POST request manner, and a to-be-sent message is an image-text message, a request example of the group-sending interface invocation request is as follows: https://api.xxxxx.com/cgi-bin/message/mass/sendall, and an example of POST data carried in the group-sending interface invocation request is as follows:

```
{
"filter":{
"is_to_all":false
"group_id":"2"
},
"mpnews":{
"media_id":"123dsdajkasd231jhksad"
},
"msgtype":"mpnews"
}
```

Descriptions of parameters in the group-sending interface invocation request are shown in the following Table 3.

TABLE 3

| Parameter | Description |
| --- | --- |
| is_to_all | The parameter is used to set whether sending is performed to all followers, a value is true or false, selecting true indicates that sending is performed to all the followers, and selecting false indicates that sending can be performed to a follower in a designated follower group according to group_id |
| group_id | Group identifier |
| mpnews | Indicate an image-text message |
| media_id | Material identifier |
| msgtype | The parameter indicates a message type, a message type of a text message is a text, a message type of an image-text is mpnews, a message type of a voice message is a voice, a message type of a music message is music, a message type of an image message is an image, and a message type of a video message is a video |

Step 312: The third-party server sends the group-sending interface invocation request to the open platform server.

Correspondingly, the open platform server receives the group-sending interface invocation request sent by the third-party server.

Step 314: The open platform server invokes, according to the group-sending interface invocation request, a message group-sending interface to send the message to a client terminal corresponding to a user account in a follower group corresponding to each of the at least one group identifier.

Specifically, when the message includes the message content identifier, the open platform server invokes, according to the group-sending interface invocation request, the message group-sending interface to obtain the message content corresponding to the message content identifier, and sends the message content to the client terminal corresponding to the user account in the follower group corresponding to each of the at least one group identifier. For example, the open platform server invokes the message group-sending interface to obtain a message content corresponding to a message content identifier "123dsdajkasd231jhksad", and then sends the obtained image-text message content to each client. In addition, when the message does not include the message content identifier, the open platform server may invoke the message group-sending interface to directly send message content to each client.

For a multicast message having a relatively large data volume, such as an image-text message, a voice message, a music message, an image message, or a video message, a manner of uploading a message content to the open platform server in advance is used to upload an image, audio, or a video, so that when a message needs to be sent to a follower, a message content identifier needs to be added only to the group-sending interface invocation request, so as to improve request efficiency of the group-sending interface invocation request. In addition, for some messages needing to be sent to a same follower or different followers repeatedly, the third-party server needs to upload the message content to the open platform server once, and subsequently needs to add the message content identifier to the group-sending interface invocation request in a process of group-sending a request, and does not need to upload the message content to the open platform server repeatedly, facilitating saving of transmission resources, and reducing processing overheads of the open platform server.

It should be noted that, for a text message, the method provided in this embodiment may also be used to upload the text message content to the open platform server in advance, and then when a message needs to be sent to a follower, only a message content identifier needs to be added to the group-sending interface invocation request. In an actual application, considering that a data volume of a text message is much less as compared with a data volume of a multi-media message, use of a manner of directly adding message content of the text message to the group-sending interface invocation request is suggested. However, using the manner provided in this embodiment to send the text message is not limited.

It should be further noted that the foregoing step 302, step 304, step 310, and step 312 may be independently implemented as a message sending method that is on a side of the third-party server, and the foregoing step 306, step 308, and step 314 may be independently implemented as the message sending method that is on a side of the open platform server.

It should be further noted that this embodiment is described only by using an example in which a service provider of the target user account interacts with the open platform server by using the third-party server. In another possible implementation manner, the operator of the target user account may also interact with the open platform server by using a client program. Alternatively, the operator of the target user account may further log on to the third-party server by using the client program, and control, by using the client program, the third-party server to interact with the open platform server. This is not limited in this embodiment.

To sum up, by means of the message sending method provided in this embodiment, a third-party server generates a group-sending interface invocation request carrying a to-be-sent message and at least one group identifier, sends the group-sending interface invocation request to an open platform server, and invokes a message group-sending interface to send the message to a client terminal corresponding to a user account in a follower group corresponding to each of the at least one group identifier. In this way, a problem, which exists when a message is sent by using a related technology, of complex operations and low message sending efficiency is resolved. As long as a service provider adds group identifiers of one or multiple follower groups to an interface invocation request, the operator can group-send a message to followers in the one or more follower groups, instead of adding user accounts of the followers one by one, achieving effects of simplifying the operations and improving the message sending efficiency.

In addition, by means of this message sending method provided in this embodiment, a third-party server further uploads a message content to an open platform server in advance, so that on one hand, when a message needs to be sent to a follower, a message content identifier needs to be added only to a group-sending interface invocation request, thereby improving request efficiency of the group-sending interface invocation request; on the other hand, for some messages needing to be sent to a same follower or different followers repeatedly, the third-party server needs to upload the message content to the open platform server only once, subsequently needs to add the message content identifier only to the group-sending interface invocation request in a process of requesting to perform group-sending, and does not need to upload the message content to the open platform server repeatedly, facilitating saving of transmission resources, and reducing processing overheads of the open platform server.

Figure 4:
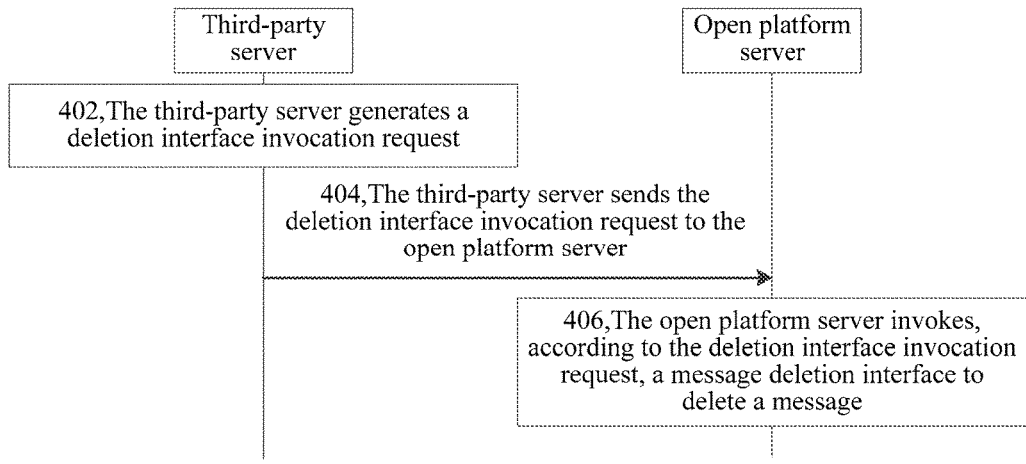
FIG. 4 is a method flowchart of a message sending method according to another embodiment of the present application.

Referring to FIG. 4, FIG. 4 is a method flowchart of a message sending method according to another embodiment of the present application. As shown in FIG. 4, after sending the group-sending interface invocation request to an open platform server, the third-party server may further perform the following steps to delete a message requested to be group-sent:

Step 402: The third-party server generates a deletion interface invocation request.

The deletion interface invocation request carries a message identifier corresponding to a message, and the message identifier is generated after the open platform server receives the group-sending interface invocation request and is then sent to the third-party server. The deletion interface invocation request is used to invoke a message deletion interface provided by the open platform server. The message deletion interface is configured to delete a message. Specifically, the message deletion interface is configured to delete the message corresponding to the message identifier.

It is already introduced in the embodiment shown in FIG. 2 that, after succeeding in invoking the message group-sending interface to execute a group-sending task, the open platform server may generate the message identifier corresponding to the message, and send the message identifier to the third-party server. In this embodiment, the open platform server provides, to a service provider by providing the message deletion interface to the third-party server, a function of deleting a message that is already submitted to the open platform server. For example, when the operator finds cases in which message content is incorrect, message content does not comply to specifications, and message content needs to be changed, the message deletion interface may be configured to delete the message that is already submitted to the open platform server.

In some implementations, the deletion interface invocation request further carries an interface address of the message deletion interface, and the interface address is used to instruct the open platform server to invoke the message deletion interface.

In addition, a request protocol used by the deletion interface invocation request may be the HTTP, or may be the HTTPS, or may be another user-defined protocol. A request manner used by the deletion interface invocation request may be a POST request manner.

For example, a request example of the deletion interface invocation request is as follows: https://api.xxxxx.com/cgi-bin/message/mass/delete, and an example of POST data of the deletion interface invocation request is as follows:

```
{
"msg_id":30124
}
```

Descriptions of parameters in the deletion interface invocation request are shown in the following Table 4.

TABLE 4

| Parameter | Description |
| --- | --- |
| msg_id | Message identifier |

Step 404: The third-party server sends the deletion interface invocation request to the open platform server.

Correspondingly, the open platform server receives the deletion interface invocation request sent by the third-party server.

Step 406: The open platform server invokes, according to the deletion interface invocation request, the message deletion interface to delete the message.

After receiving the deletion interface invocation request, the open platform server invokes the message deletion interface. In some implementations, when the deletion interface invocation request carries the interface address of the message deletion interface (that is, the foregoing enumerated api.xxxxx.com/cgi-bin/message/mass/delete), the open platform server invokes the message deletion interface according to the interface address. The message deletion interface is configured to delete the message corresponding to the message identifier carried in the deletion interface invocation request.

It should be noted that, a deletion operation involved in this embodiment refers to deleting the message from the open platform server, for example, deleting a message content or a link corresponding to the message from the open platform server, so that a client subsequently cannot obtain content such as the message content or the link corresponding to the message from the open platform server. For an already sent message, a follower still may receive description information such as a message title, a cover, or a thumbnail from the client, and only cannot obtain, by means of a further operation, specific content such as the message content and the link corresponding to the message.

It should be further noted that this embodiment is described only by using an example in which a service provider of a target user account interacts with the open platform server by using the third-party server. In another possible implementation manner, the operator of the target user account may also interact with the open platform server by using a client program. Alternatively, the operator of the target user account may further log on to the third-party server by using the client program, and control, by using the client program, the third-party server to interact with the open platform server. This is not limited in this embodiment.

To sum up, by means of the message sending method provided in this embodiment, a third-party server further invokes a message deletion interface provided by an open platform server, to delete a message that is already submitted to the open platform server, extending a function that a service provider deletes a group-sent message, and preventing a follower from checking incorrect or inappropriate information.

Figure 5:
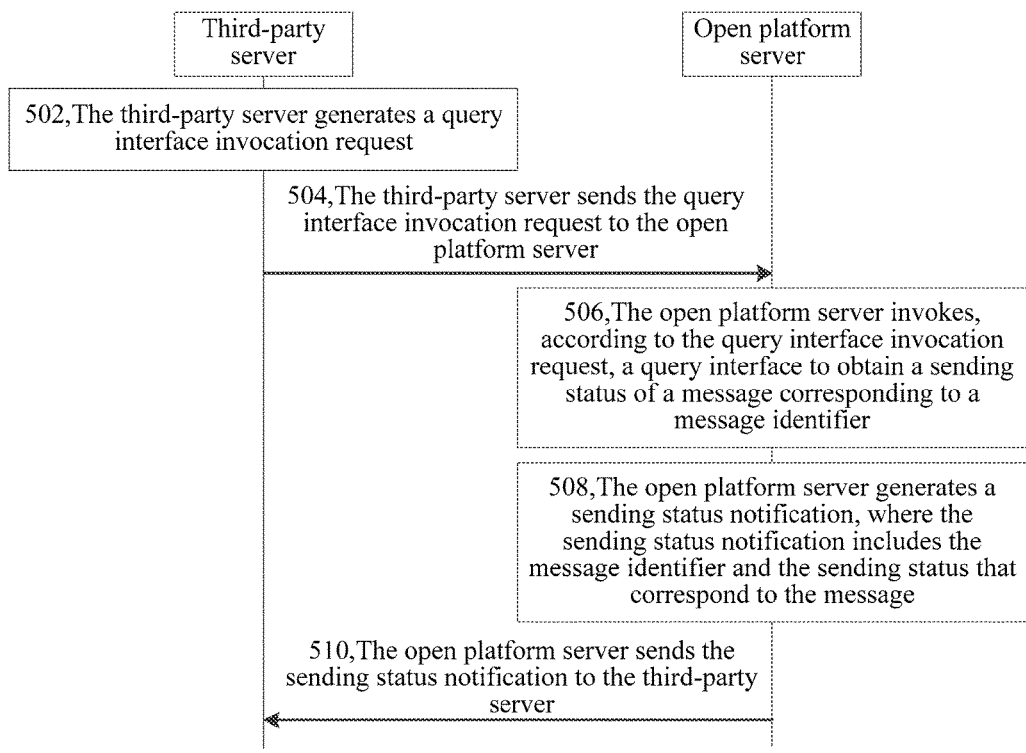
FIG. 5 is a method flowchart of a message sending method according to another embodiment of the present application.

Referring to FIG. 5, FIG. 5 is a method flowchart of a message sending method according to another embodiment of the present application. As shown in FIG. 5, after sending the group-sending interface invocation request to an open platform server, the third-party server may further perform the following steps to check a sending status of a message:

Step 502: The third-party server generates a query interface invocation request.

The query interface invocation request carries a message identifier corresponding to a message, and the message identifier is generated after the open platform server receives the group-sending interface invocation request and is then sent to the third-party server. The group-sending interface invocation request is used to invoke a query interface provided by the open platform server. The query interface is configured to query the sending status of the message. Specifically, the query interface is configured to query a sending status of the message corresponding to the message identifier.

It is already introduced in the embodiment shown in FIG. 2 that, after succeeding in invoking the message group-sending interface to execute a group-sending task, the open platform server may generate the message identifier corresponding to the message, and send the message identifier to the third-party server. In this embodiment, the open platform server provides, to a service provider by providing the query interface to the third-party server, a function of querying for a sending status of a message that is already submitted to the open platform server. For example, the operator may use the query interface to obtain information: whether sending of the message is completed, a quantity of followers to which a message is sent, a quantity of followers to which a message fails to be sent, or the like.

In some implementations, the query interface invocation request may further carry an interface address of the query interface, and the interface address is used to instruct the open platform server to invoke the query interface.

In addition, a request protocol used by the query interface invocation request may be the HTTP, or may be the HTTPS, or may be another user-defined protocol. A request manner used by the query interface invocation request may be a POST request manner.

For example, a request example of the query interface invocation request is as follows: https://api.xxxxx.com/cgi-bin/message/mass/get, and an example of POST data of the query interface invocation request is as follows:

```
{
    "msg_id":"201053012"
}
```

Descriptions of parameters of the query interface invocation request are shown in the following Table 5:

TABLE 5

| Parameter | Description |
| --- | --- |
| msg_id | Message identifier |

Step 504: The third-party server sends the query interface invocation request to the open platform server.

Correspondingly, the open platform server receives the query interface invocation request sent by the third-party server.

Step 506: The open platform server invokes, according to the query interface invocation request, the query interface to obtain the sending status of the message corresponding to the message identifier.

After receiving the query interface invocation request, the open platform server invokes the query interface. In some implementations, when the query interface invocation request carries the interface address (that is, the foregoing enumerated) of the query interface, the open platform server invokes the query interface according to the interface address. The query interface is configured to obtain the sending status of the message corresponding to the message identifier.

The sending status includes, but is not limited to, one or more of the following information: whether sending of the message is completed, a quantity of followers to which a message is sent, a quantity of followers to which a message fails to be sent, a reason why sending fails (for example, an error code, error information, or a filtering factor), and the like.

Step 508: The open platform server generates a sending status notification, where the sending status notification includes the message identifier and the sending status that correspond to the message.

Step 510: The open platform server sends the sending status notification to the third-party server.

Correspondingly, the third-party server receives the sending status notification sent by the open platform server.

After receiving the sending status notification, the third-party server may display the sending status notification, so as to provide the sending status of the message to the operator.

It should be noted that this embodiment is described only by using an example in which the third-party server invokes the query interface provided by the open platform server to obtain the sending status of the message. In another possible implementation manner, the open platform server may also proactively obtain the sending status of the message, and return the sending status notification to the third-party server. For example, after generating the sending status notification, the open platform server proactively pushes the sending status notification to a callback URL according to the callback uniform resource locator (URL) that is provided when the operator registers a user account. This is not limited in this embodiment.

It should be further noted that this embodiment is described only by using an example in which a service provider of a target user account interacts with the open platform server by using the third-party server. In another possible implementation manner, the operator of the target user account may also interact with the open platform server by using a client program. Alternatively, the operator of the target user account may further log on to the third-party server by using the client program, and control, by using the client program, the third-party server to interact with the open platform server. This is not limited in this embodiment.

To sum up, by means of the message sending method provided in this embodiment, an open platform server further provides a sending status of a message to a third-party server, so that a service provider can learn information whether the message is successfully sent, fully improving user experience.

Figure 6:
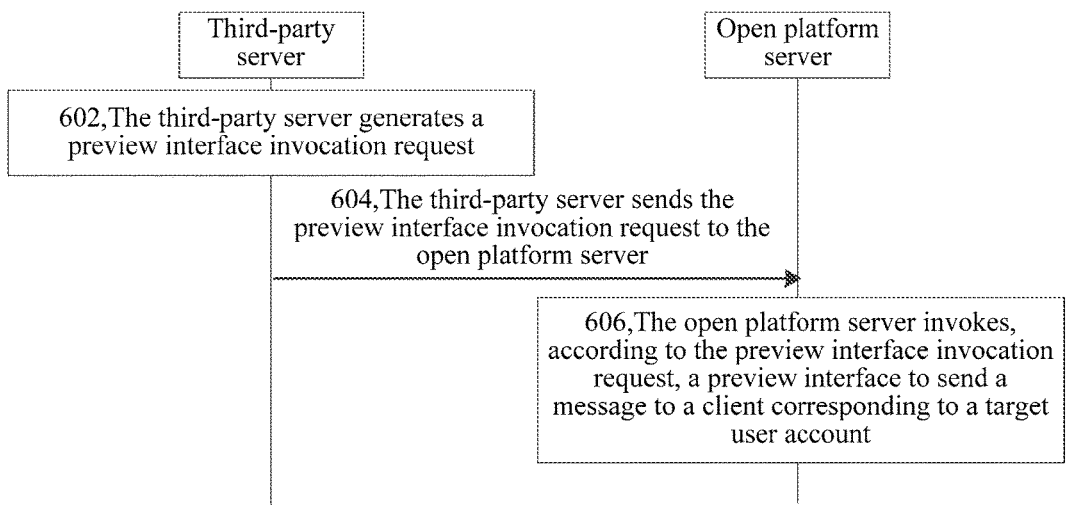
FIG. 6 is a method flowchart of a message sending method according to another embodiment of the present application.

Referring to FIG. 6, FIG. 6 is a method flowchart of a message sending method according to another embodiment of the present application. As shown in FIG. 6, after generating the group-sending interface invocation request, the third-party server may further perform the following steps to preview a to-be-sent message:

Step 602: The third-party server generates a preview interface invocation request.

The preview interface invocation request carries the to-be-sent message and a target user account. The preview interface invocation request is used to invoke a preview interface provided by the open platform server. The preview interface is configured to send the foregoing message to a client corresponding to the target user account.

Before sending the message to a follower by using a message group-sending interface, the operator may preview the to-be-sent message by using the preview interface provided by the open platform server, so that content, a style, a composition, and the like of the message are proofread. After proofreading is completed and there is no error, the message is delivered to the follower by using the message group-sending interface, thereby ensuring that the follower receives a message whose content is accurate, style is beautiful, and composition is reasonable.

In some implementations, the preview interface invocation request may further carry an interface address of the preview interface, and the interface address is used to instruct the open platform server to invoke the preview interface.

In addition, a request protocol used by the preview interface invocation request may be the HTTP, or may be the HTTPS, or may be another user-defined protocol. A request manner used by the preview interface invocation request may be a POST request manner.

Using an example of previewing an image-text message, a request example of the preview interface invocation request is as follows: https://api.xxxxx.com/cgi-bin/message/mass/preview, and an example of POST data of the preview interface invocation request is as follows:

```
{
  "touser":"OPENID",
  "mpnews":{
      "media_id":"123dsdajkasd231jhksad"
    },
  "msgtype":"mpnews"
}
```

Descriptions of parameters in the preview interface invocation request are shown in the following Table 6.

TABLE 6

| Parameter | Description |
| --- | --- |
| touser | User account of a target user |
| mpnews | Indicate an image-text message |
| media_id | Material identifier |
| msgtype | The parameter indicates a message type, a message type of a text message is a text, a message type of an image-text is mpnews, a message type of a voice message is a voice, a message type of a music message is music, a message type of an image message is an image, and a message type of a video message is a video |

Step 604: The third-party server sends the preview interface invocation request to the open platform server.

Correspondingly, the open platform server receives the preview interface invocation request sent by the third-party server.

Step 606: The open platform server invokes, according to the preview interface invocation request, a preview interface to send the message to a client corresponding to the target user account.

After receiving the preview interface invocation request, the open platform server invokes the preview interface. In some implementations, when the preview interface invocation request carries an interface address of the preview interface (that is, the foregoing enumerated api.xxxxx.com/ cgi-bin/message/mass/preview), the open platform server invokes the preview interface according to the interface address. The preview interface is configured to send the message to the client corresponding to the target user account carried in the preview interface invocation request.

Correspondingly, after receiving the message sent by the open platform server, the client displays the message. Related personnel may preview the message according to a display interface, so as to proofread content, a style, a composition, and the like of the message.

It should be noted that this embodiment is described only by using an example in which a service provider of the target user account interacts with the open platform server by using the third-party server. In another possible implementation manner, the operator of the target user account may also interact with the open platform server by using a client program. Alternatively, the operator of the target user account may further log on to the third-party server by using the client program, and control, by using the client program, the third-party server to interact with the open platform server. This is not limited in this embodiment.

To sum up, by means of the message sending method provided in this embodiment, a third-party server further invokes a preview interface provided by an open platform server, to preview a to-be-sent message before a group-sending task is executed, and execute the group-sending task after it is ensured that the to-be-sent message is correct, thereby ensuring that a follower receives a message whose content is accurate, style is beautiful, and composition is reasonable. Therefore, on one hand, a service provider may check and preview the message before group-sending, improving service quality of the operator. On the other hand, user experience of the follower is also improved.

Figure 7:
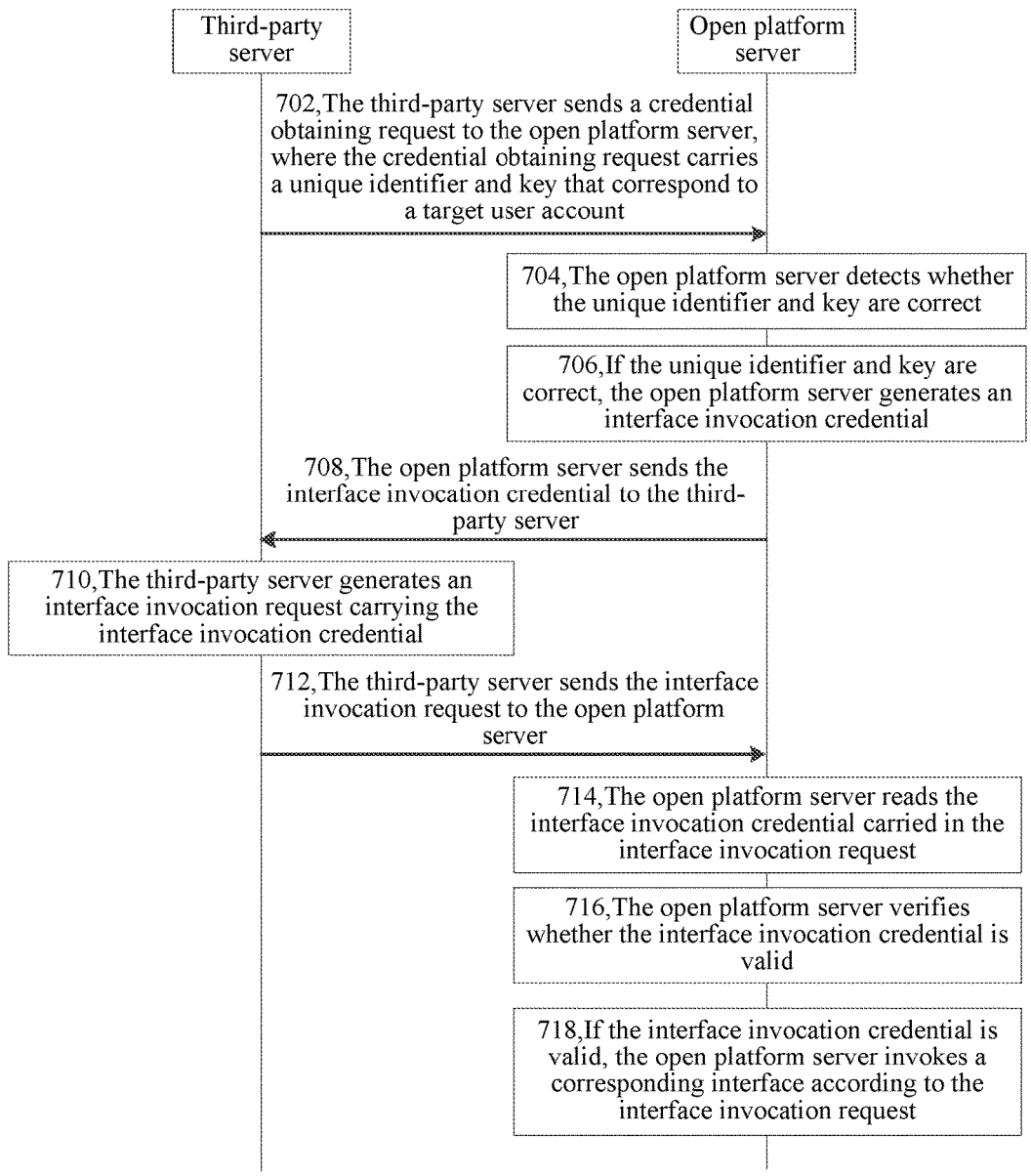
FIG. 7 is a method flowchart of a message sending method according to another embodiment of the present application.

Referring to FIG. 7, FIG. 7 is a method flowchart of a message sending method according to another embodiment of the present application. As shown in FIG. 7, after generating an interface invocation request, the third-party server may further perform the following step 702 to step 708:

Step 702: The third-party server sends a credential obtaining request to an open platform server, where the credential obtaining request carries a unique identifier and key that correspond to the target user account.

The target user account is a user account corresponding to the third-party server, and the target user account is obtained after the third-party server performs registration in the open platform server in advance. The unique identifier and key are obtained by the third-party server from the open platform server in advance. For example, after registering the target user account is completed, the open platform server sends the corresponding unique identifier and key to the third-party server.

In some implementations, the third-party server may invoke a credential obtaining interface provided by the open platform server, and the credential obtaining interface is configured to provide an interface invocation credential to the third-party server.

For example, a request protocol used by the credential obtaining request is the HTTPS, and a request manner is GET request manner. A request example of the credential obtaining request is as follows: https://api.xxxxx.com/cgi-bin/token?grant_type=client_credential&appid=APPID&secret=APPSECRET Descriptions of parameters in the credential obtaining request are shown in the following Table 7.

TABLE 7

| Parameter | Description |
| --- | --- |
| grant_type | The parameter is used to instruct to obtain an interface invocation credential access_token |
| appid | Unique identifier |
| secret | Key |

Correspondingly, the open platform server receives the credential obtaining request sent by the third-party server.

Step 704: The open platform server detects whether the unique identifier and key are correct.

Step 706: If the unique identifier and key are correct, the open platform server generates the interface invocation credential.

The interface invocation credential is a credential when the third-party server requests to invoke message management interfaces. The open platform server may generate the interface invocation credential according to the unique identifier and key that correspond to the target user account. For example, the unique identifier and key are calculated according to a predetermined algorithm to obtain the interface invocation credential. The interface invocation credential may be one character string. Alternatively, in another possible implementation manner, the interface invocation credential may also be a randomly generated character ring.

In some implementations, the open platform server may further set a credential validation time corresponding to the interface invocation credential. Within the credential validation time, the interface invocation credential is effective; otherwise, the interface invocation credential expires and is invalid.

Step 708: The open platform server sends the interface invocation credential to the third-party server.

For example, the open platform server sends returning data in a JavaScript Object Notation (JSON, a lightweight data exchange format) format to the third-party server, and the returning data is as follows: {"access_token": "ACCESS_TOKEN","expires_in":7200}

Descriptions of parameters in the returning data are shown in the following Table 8.

TABLE 8

| Parameter | Description |
| --- | --- |
| access_token | Interface invocation credential |
| expires_in | Credential validation time, unit: second |

Correspondingly, the third-party server receives the interface invocation credential sent by the open platform server.

In addition, when the unique identifier and key are incorrect, the open platform server may return an error code and/or error information to the third-party server.

Step 710: The third-party server generates an interface invocation request carrying the interface invocation credential.

The interface invocation request may be any one of the group-sending interface invocation request, the uploading interface invocation request, the deletion interface invocation request, the query interface invocation request, and the preview interface invocation request that are involved in the embodiments shown in FIG. 2 to FIG. 6. In addition, for different interface invocation requests, other parameters needing to be carried in the interface invocation request are already separately described in the embodiments shown in FIG. 2 and FIG. 6. For details, refer to the foregoing descriptions, and this is not described again in this embodiment.

Step 712: The third-party server sends the interface invocation request to the open platform server.

Correspondingly, the open platform server receives the interface invocation request sent by the third-party server.

Step 714: The open platform server reads the interface invocation credential carried in the interface invocation request.

Step 716: The open platform server verifies whether the interface invocation credential is valid.

The open platform server may verifies whether the interface invocation credential is correct, and verifies whether the interface invocation credential expires. If the interface invocation credential is correct and does not expire, it indicates that the interface invocation credential is valid.

Step 718: If the interface invocation credential is valid, the open platform server invokes a corresponding interface according to the interface invocation request.

When the interface invocation credential is valid, the open platform server invokes the corresponding interface according to the interface invocation request. In some implementations, the open platform server invokes, according to an interface address carried in the interface invocation request, an interface corresponding to the interface address. The interface may be any one of the message group-sending interface, the message content uploading interface, the message deletion interface, the query interface, and the preview interface that are involved in the embodiments shown in FIG. 2 to FIG. 6. The functions of the interfaces are already separately described in the embodiments shown in FIG. 2 to FIG. 6. For details, refer to the foregoing descriptions, and this is not described again in this embodiment.

In some implementations, when the interface invocation credential is invalid, for example, the interface invocation credential is incorrect or the interface invocation credential expires, the open platform server may directly terminate the procedure, or may return the corresponding error code and/or error information to the third-party server. Alternatively, when the interface invocation request does not carry the interface invocation credential, the open platform server may directly terminate the procedure, or may return corresponding error code and/or error information to the third-party server.

It should be noted that this embodiment is described only by using an example in which a service provider of the target user account interacts with the open platform server by using the third-party server. In another possible implementation manner, the operator of the target user account may also interact with the open platform server by using a client program. Alternatively, the operator of the target user account may further log on to the third-party server by using the client program, and control, by using the client program, the third-party server to interact with the open platform server. This is not limited in this embodiment.

To sum up, by means of the message sending method provided in this embodiment, an interface invocation credential is used to manage and maintain a right of invoking, by a third-party server, an interface provided by an open platform server, avoiding unnecessary processing overheads of the open platform server that are caused by that some malicious persons randomly invoke the interface, and providing security assurance for invoking of the interface; in addition, also facilitating ensuring of security of a to-be-sent message that is submitted by the third-party server to the open platform server.

It should be noted that the open platform server may set different group-sending rights for different types of user accounts. With different grouping-sending rights, limitations of a quantity of times of invoking the message group-sending interface and an invoking frequency are different. For example, when a first type of user account has a first group-sending right, the user account may successfully invoke the message group-sending interface 100 times each day; when a second type of user account has a second group-sending right, the user account may successfully invoke the message group-sending interface four times each month. Different group-sending rights are set for different types of user accounts, implementing a more flexible group-sending capability management.

Apparatus embodiments of the present application are in the following, and may be used to execute the method embodiments of the present application. For undisclosed details of the apparatus embodiments of the present application, refer to the method embodiments of the present application.

Figure 8:
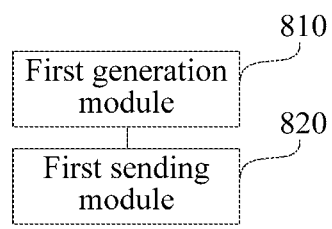
FIG. 8 is a structural block diagram of a message sending apparatus according to an embodiment of the present application.

Referring to FIG. 8, FIG. 8 is a structural block diagram of a message sending apparatus according to an embodiment of the present application. The message sending apparatus may be implemented as a part or all of a third-party server by using software, hardware, or a combination thereof. The message sending apparatus may include: a first generation module 810 and a first sending module 820.

The first generation module 810 is configured to generate a group-sending interface invocation request.

The group-sending interface invocation request carries a to-be-sent message and at least one group identifier, a follower group corresponding to each group identifier includes a user account of at least one follower of a target user account, the target user account is a user account that a service provider applies for to the social networking application, the group-sending interface invocation request is used to invoke a message group-sending interface provided by the open platform server, and the message group-sending interface is configured to send the message to a client terminal corresponding to a user account in a follower group corresponding to each of the at least one group identifier.

The first sending module 820 is configured to send the group-sending interface invocation request to the open platform server.

To sum up, by means of the message sending apparatus provided in this embodiment, a third-party server generates a group-sending interface invocation request carrying a to-be-sent message and at least one group identifier, sends the group-sending interface invocation request to an open platform server, and invokes a message group-sending interface to send the message to a client terminal corresponding to a user account in a follower group corresponding to each of the at least one group identifier. In this way, a problem, which exists when a message is sent by using a related technology, of complex operations and low message sending efficiency is resolved. As long as a service provider adds group identifiers of one or multiple follower groups to an interface invocation request, the operator can group-send a message to followers in the one or more follower groups, instead of adding user accounts of the followers one by one, achieving effects of simplifying the operations and improving the message sending efficiency.

Figure 9:
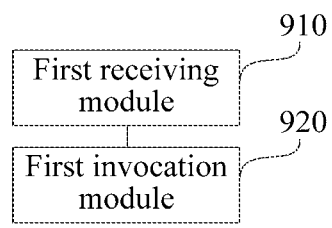
FIG. 9 is a structural block diagram of a message sending apparatus according to another embodiment of the present application.

Referring to FIG. 9, FIG. 9 is a structural block diagram of a message sending apparatus according to another embodiment of the present application. The message sending apparatus may be implemented as a part or all of an open platform server by using software, hardware, or a combination thereof. The message sending apparatus may include: a first receiving module 910 and a first invocation module 920.

The first receiving module 910 is configured to receive a group-sending interface invocation request sent by a target user account, where the group-sending interface invocation request carries a to-be-sent message and at least one group identifier, a follower group corresponding to each group identifier includes a user account of at least one follower of the target user account, and the target user account is a user account that a service provider applies for in the open platform server.

The first invocation module 920 is configured to invoke, according to the group-sending interface invocation request, a message group-sending interface to send the message to a client terminal corresponding to a user account in a follower group corresponding to each of the at least one group identifier.

To sum up, by means of the message sending apparatus provided in this embodiment, an open platform server receives a group-sending interface invocation request sent by a target user account, and invokes, according to the group-sending interface invocation request, a message group-sending interface to send the message to a client terminal corresponding to a user account in a follower group corresponding to each of at least one group identifier. In this way, a problem, which exists when a message is sent by using a related technology, of complex operations and low message sending efficiency is resolved. As long as a service provider adds group identifiers of one or multiple follower groups to an interface invocation request, the operator can group-send a message to followers in the one or more follower groups, instead of adding user accounts of the followers one by one, achieving effects of simplifying the operations and improving the message sending efficiency.

Figure 10:
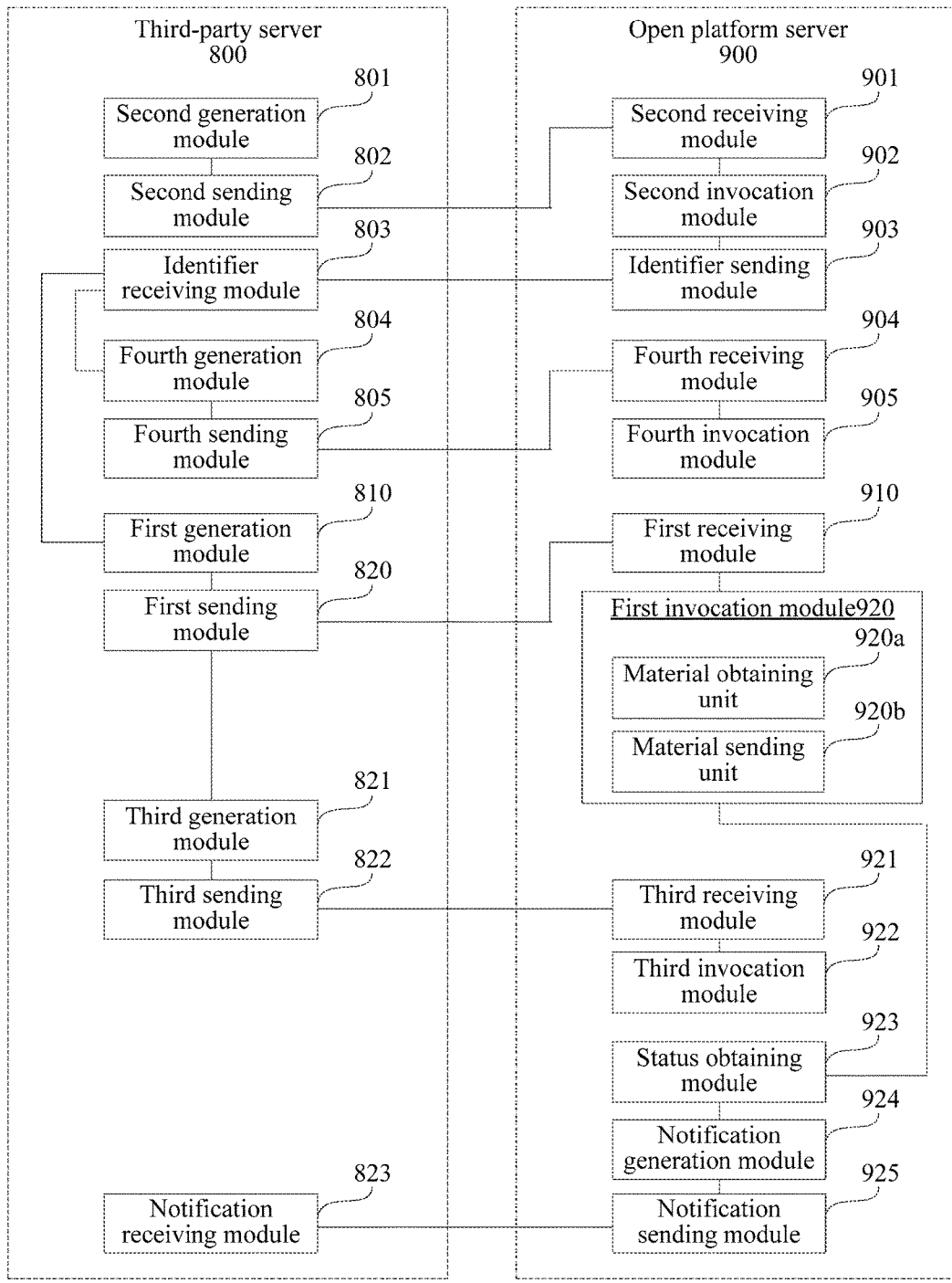
FIG. 10 is a structural block diagram of a message sending system according to an embodiment of the present application.

Referring to FIG. 10, FIG. 10 is a structural block diagram of a message sending system according to an embodiment of the present application. The message sending system may include: a third-party server 800 and an open platform server 900. The third-party server 800 may be connected to the open platform server 900 by using a wired network or a wireless network.

The third-party server 800 may include the message sending apparatus, and the message sending apparatus may be implemented as a part or all of the third-party server 800 by using software, hardware, or a combination thereof. The message sending apparatus may include: a first generation module 810 and a first sending module 820.

The first generation module 810 is configured to generate a group-sending interface invocation request.

The group-sending interface invocation request carries a to-be-sent message and at least one group identifier, a follower group corresponding to each group identifier includes a user account of at least one follower of a target user account, the target user account is a user account that a service provider applies for in the open platform server 900, the group-sending interface invocation request is used to invoke a message group-sending interface provided by the open platform server 900, and the message group-sending interface is configured to send the message to a client terminal corresponding to a user account in a follower group corresponding to each of the at least one group identifier.

The first sending module 820 is configured to send the group-sending interface invocation request to the open platform server 900.

In some implementations, when a message type of the message is any one of an image-text message, a voice message, a music message, an image message, and a video message, the message includes a message content identifier corresponding to a message content.

In some implementations, the apparatus further includes: a second generation module 801, a second sending module 802, and an identifier receiving module 803.

The second generation module 801 is configured to generate an uploading interface invocation request, where the uploading interface invocation request carries a message content to be uploaded, the uploading interface invocation request is used to invoke a message content uploading interface provided by the open platform server 900, and the message content uploading interface is configured to store the message content.

The second sending module 802 is configured to send the uploading interface invocation request to the open platform server 900.

The identifier receiving module 803 is configured to receive the message content identifier that corresponds to the message content and that is sent by the open platform server 900.

In some implementations, the apparatus further includes: a third generation module 821 and a third sending module 822.

The third generation module 821 is configured to generate a deletion interface invocation request, where the deletion interface invocation request carries a message identifier corresponding to the message, the message identifier is generated after the open platform server 900 receives the group-sending interface invocation request and is fed back to the target user account, the deletion interface invocation request is used to invoke a message deletion interface provided by the open platform server 900, and the message deletion interface is configured to delete the message.

The third sending module 822 is configured to send the deletion interface invocation request to the open platform server 900.

In some implementations, the apparatus further includes: a notification receiving module 823.

The notification receiving module 823 is configured to receive a sending status notification sent by the open platform server 900.

The sending status notification includes the message identifier and a sending status that correspond to the message.

In some implementations, the apparatus further includes: a fourth generation module 804 and a fourth sending module 805.

The fourth generation module 804 is configured to generate a preview interface invocation request, where the preview interface invocation request carries the message and the target user account, the preview interface invocation request is used to invoke a preview interface provided by the open platform server 900, and the preview interface is configured to send the message to a client corresponding to the target user account.

The fourth sending module 805 is configured to send the preview interface invocation request to the open platform server 900.

The open platform server 900 may include the message sending apparatus, and the message sending apparatus may be implemented as a part or all of the open platform server 900 by using software, hardware, or a combination thereof. The message sending apparatus may include: a first receiving module 910 and a first invocation module 920.

The first receiving module 910 is configured to receive a group-sending interface invocation request sent by the target user account (that is, the third-party server 800 in this embodiment), where the group-sending interface invocation request carries a to-be-sent message and at least one group identifier, a follower group corresponding to each group identifier includes a user account of at least one follower of the target user account, and the target user account is a user account that a service provider applies for in the open platform server.

The first invocation module 920 is configured to invoke, according to the group-sending interface invocation request, a message group-sending interface to send the message to a client terminal corresponding to a user account in a follower group corresponding to each of the at least one group identifier.

In some implementations, the first invocation module 920 includes: a message content obtaining unit 920a and a message content sending unit 920b.

The message content obtaining unit 920a is configured to: when the message includes a message content identifier, invoke, according to the group-sending interface invocation request, the message group-sending interface to obtain a message content corresponding to the message content identifier, where the message content is any one of an image-text message content, a voice message content, a music message content, an image message content, and a video message content.

The message content sending unit 920b is configured to send the message content to the client terminal corresponding to the user account in the follower group corresponding to each of the at least one group identifier.

In some implementations, the apparatus further includes: a second receiving module 901, a second invocation module 902, and an identifier sending module 903.

The second receiving module 901 is configured to receive an uploading interface invocation request sent by the target user account, where the uploading interface invocation request carries a message content to be uploaded.

The second invocation module 902 is configured to invoke, according to the uploading interface invocation request, a message content uploading interface to store the message content, and generate the message content identifier corresponding to the message content.

The identifier sending module 903 is configured to send the message content identifier to the target user account.

In some implementations, the apparatus further includes: a third receiving module 921 and a third invocation module 922.

The third receiving module 921 is configured to receive a deletion interface invocation request sent by the target user account, where the deletion interface invocation request carries a message identifier corresponding to the message, and the message identifier is generated after the open platform server 900 receives the group-sending interface invocation request and is sent to the target user account.

The third invocation module 922 is configured to invoke, according to the deletion interface invocation request, a message deletion interface to delete the message.

In some implementations, the apparatus further includes: a status obtaining module 923, a notification generation module 924, and a notification sending module 925.

The status obtaining module 923 is configured to obtain a sending status of the message.

The notification generation module 924 is configured to generate a sending status notification, where the sending status notification includes a message identifier and the sending status that correspond to the message.

The notification sending module 925 is configured to send the sending status notification to the target user account.

In some implementations, the apparatus further includes: a fourth receiving module 904 and a fourth invocation module 905.

The fourth receiving module 904 is configured to receive a preview interface invocation request sent by the target user account, where the preview interface invocation request carries the message and the target user account.

The fourth invocation module 905 is configured to invoke, according to the preview interface invocation request, a preview interface to send the message to a client corresponding to the target user account.

To sum up, by means of the message sending system provided in this embodiment, a third-party server generates a group-sending interface invocation request carrying a to-be-sent message and at least one group identifier, sends the group-sending interface invocation request to an open platform server, and invokes a message group-sending interface to send the message to a client terminal corresponding to a user account in a follower group corresponding to each of the at least one group identifier. In this way, a problem, which exists when a message is sent by using a related technology, of complex operations and low message sending efficiency is resolved. As long as a service provider adds group identifiers of one or multiple follower groups to an interface invocation request, the operator can group-send a message to followers in the one or more follower groups, instead of adding user accounts of the followers one by one, achieving effects of simplifying the operations and improving the message sending efficiency.

In addition, by means of the message sending system provided in this embodiment, the third-party server further uploads a message content to the open platform server in advance, so that on one hand, when a message needs to be sent to a follower, a message content identifier needs to be added only to a group-sending interface invocation request, thereby improving request efficiency of the group-sending interface invocation request; on the other hand, for some messages needing to be sent to a same follower or different followers repeatedly, the third-party server needs to upload the message content to the open platform server only once, subsequently needs to add the message content identifier only to the group-sending interface invocation request in a process of requesting to perform group-sending, and does not need to upload the message content to the open platform server repeatedly, facilitating saving of transmission resources, and reducing processing overheads of the open platform server.

In addition, by means of the message sending system provided in this embodiment, the third-party server further invokes a message deletion interface provided by the open platform server, to delete a message that is already submitted to the open platform server, extending a function that a service provider deletes a group-sent message, and preventing a follower from checking incorrect or inappropriate information.

In addition, by means of the message sending system provided in this embodiment, the open platform server further provides a sending status of the message to the third-party server, so that the operator can learn information whether the message is successfully sent, fully improving user experience.

In addition, by means of the message sending system provided in this embodiment, the third-party server further invokes a preview interface provided by the open platform server, to preview the to-be-sent message before a group-sending task is executed, and executes the group-sending task after it is ensured that the to-be-sent message is correct, thereby ensuring that a follower receives a message whose content is accurate, style is beautiful, and composition is reasonable. On one hand, the operator may check and preview the message before group-sending, improving service quality of the operator. On the other hand, user experience of the follower is also improved.

It should be noted that, when the message sending apparatus and system and the server that are provided in the embodiments provide a message sending service, only divisions of the function modules are used as an example for description. In an actual application, the foregoing functions may be allocated to and completed by different function modules as required, that is, an internal structure of the device is divided into different function modules, to complete all or some of the functions described above. In addition, the message sending apparatus and system and the server that are provided in the embodiments and the method embodiments of the message sending method belong to a same concept. For specific implementation processes thereof, specifically refer to the method embodiments, and details are not described herein again.

Figure 11:
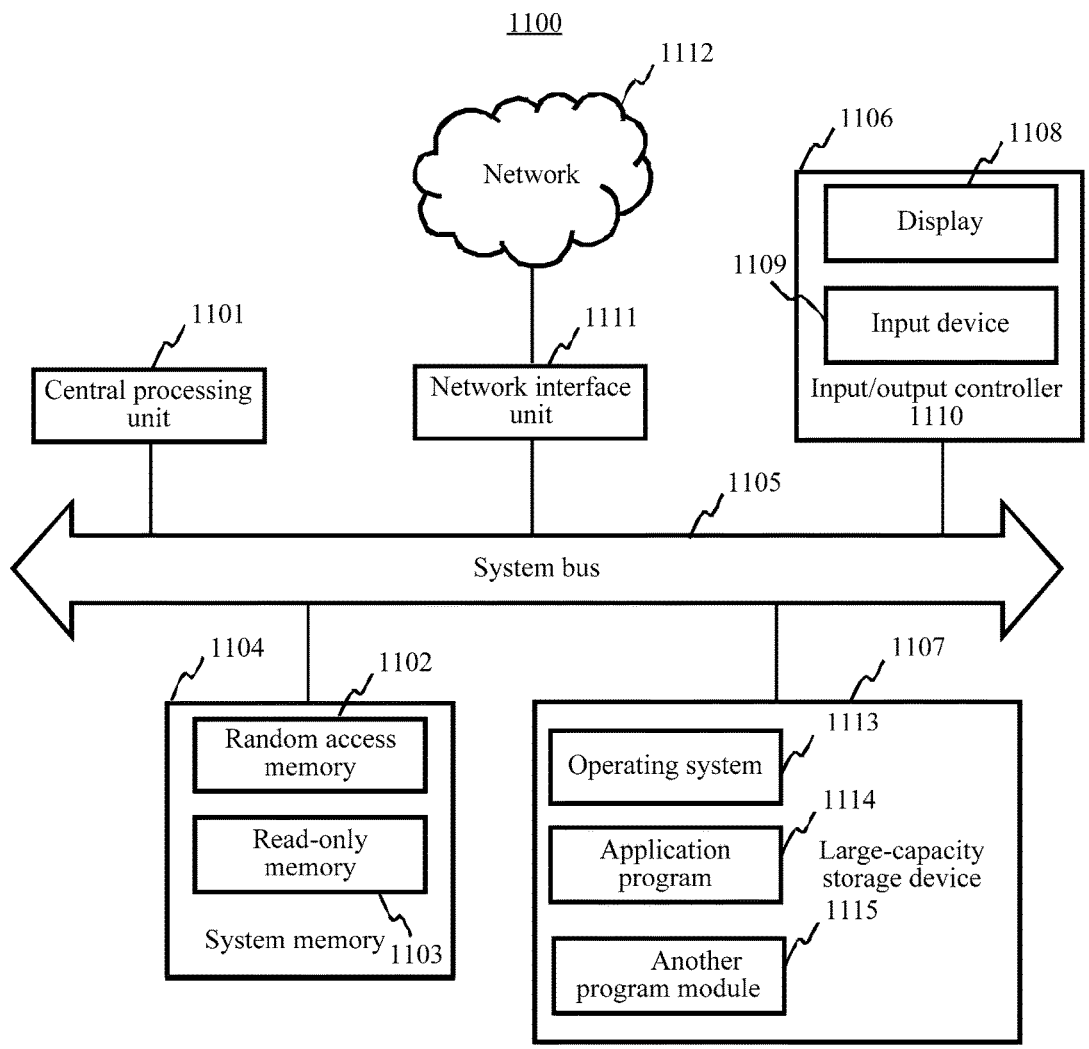
FIG. 11 is a schematic structural diagram of a server according to an embodiment of the present application.

FIG. 11 is a schematic structural diagram of a server according to an embodiment of the present application. The server is configured to implement the message sending method provided in the foregoing embodiment. The server may be a third-party server, or may be an open platform server. Specifically:

The server 1100 includes a central processing unit (CPU) 1101, a system memory 1104 including a random access memory (RAM) 1102 and a read-only memory (ROM) 1103, and a system bus 1105 connecting the system memory 1104 and the central processing unit 1101. The server 1100 further includes a basic input/output system (I/O system) 1106 helping devices in a computer to transmit information, and a large-capacity storage device 1107 that is configured to store an operating system 1113, an application program 1114, and another program module 1115.

The basic input/output system 1106 includes a display 1108 configured to display information and an input device 1109, such as a mouse or a keyboard, that is used by a user to input information. The display 1108 and the input device 1109 are both connected to the central processing unit 1101 by using an input/output controller 1110 connected to the system bus 1105. The basic input/output system 1106 may further include the input/output controller 1110, so as to receive and process input from multiple other devices, such as a keyboard, a mouse, and an electronic stylus. Similarly, the input/output controller 1110 further provides a display, a printer, or another type of output device.

The large-capacity storage device 1107 is connected to the central processing unit 1101 by using a large-capacity storage controller (not shown) connected to the system bus 1105. The large-capacity storage device 1107 and a computer readable medium associated with the large-capacity storage device 1107 provide non-volatile storage to the server 1100. That is, the large-capacity storage device 1107 may include a non-transitory computer readable storage medium (not shown), such as a hard disk or a CD-ROM driver.

Without loss of generality, the computer readable medium may include a non-transitory computer storage medium and a communications medium. The computer storage medium includes volatile and non-volatile, movable and unmovable media implemented by using any method or technology and configured to store information such as a computer readable instruction, a data structure, a program module, or other data. The computer storage medium includes a RAM, a ROM, an EPROM, an EEPROM, a flash memory, or another solid storage technology, and a CD-ROM, a DVD, or another optical storage, and a cassette, a type, a magnetic storage, or another magnetic storage device. Certainly, a person skilled in the art may know that the computer storage medium is not limited to the foregoing. The system memory 1104 and the large-capacity storage device 1107 may be uniformly referred to as a memory.

According to various embodiments of the present application, the server 1100 may run by connecting to a remote computer on a network by using a network such as the Internet. That is, the server 1100 may be connected to a network 1112 by using a network interface unit 1111 connected to the system bus 1105, or the server 1100 may be connected to a network of another type or a remote computer system (not shown) by using a network interface unit 1111.

The memory further includes one or more programs. The one or more programs are stored in a memory, and are configured to be executed by one or more processors. When the server 1100 is a third-party server, the foregoing one or more programs include instructions used to perform the message sending method on a side of the third-party server provided in any embodiment shown in FIG. 2 to FIG. 7. When the server 1100 is an open platform server, the foregoing one or more programs include instructions used to perform the message sending method, which is provided in any embodiment shown in FIG. 2 to FIG. 7, on a side of the open platform server.

Figure 12:
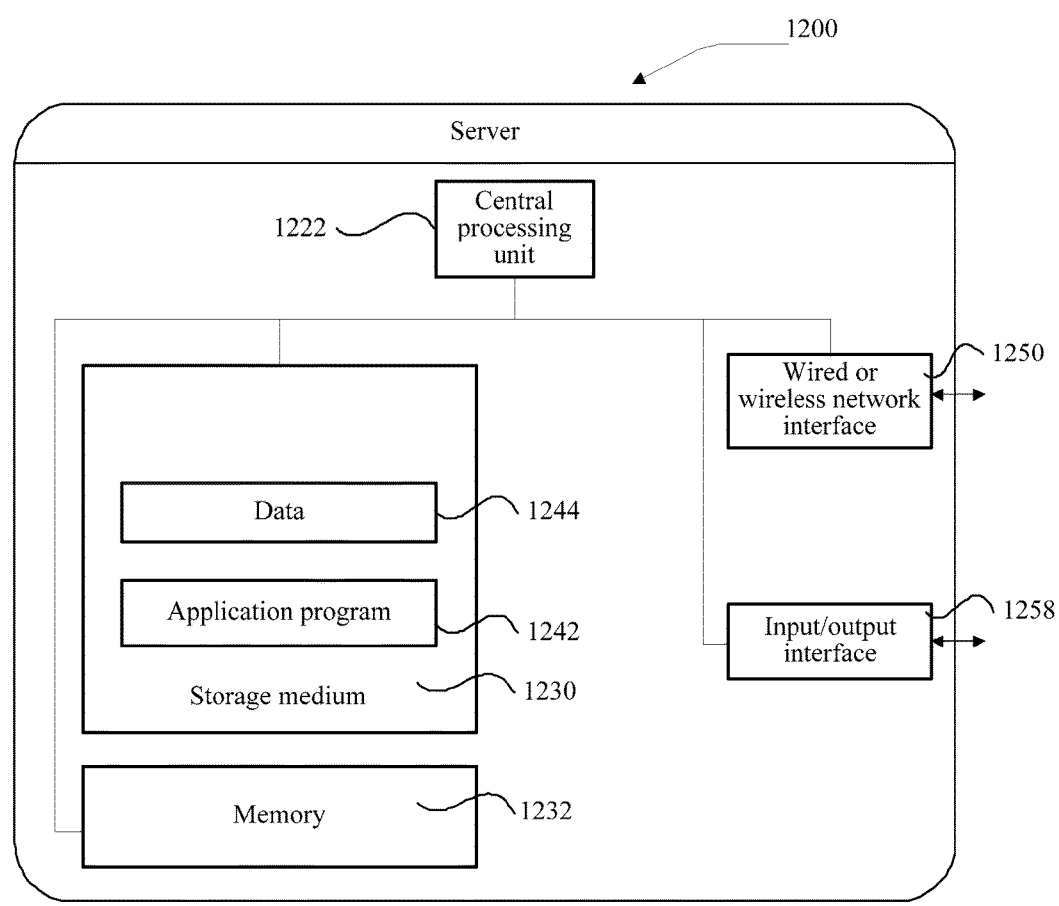
FIG. 12 is a schematic structural diagram of a server according to another embodiment of the present application.

FIG. 12 is a schematic structural diagram of a server according to an embodiment of the present application. The server 1200 may generate a relatively large difference because of different configurations or performance, may include one or more central processing units (CPU) 1222 (for example, one or more processors) and a memory 1232, and one or more storage media 1230 (for example, one or more mass storage devices) storing an application program 1242 or data 1244. The memory 1232 and the storage medium 1230 may be a transient storage or a persistent storage. The program stored in the storage medium 1230 may include one or more modules (not marked in the figure), and each module may include a series of instruction operations on the server. Further, the central processing unit 1222 may be set in a manner of communicating with the storage medium 1230, and executing, on the server 1200, a series of instruction operations in the storage medium.

The server 1200 may further include one or more wired or wireless network interfaces 1250, one or more input/output interfaces 1258, and the like.

The server 1200 may be configured to execute the steps performed by the third-party server or the open platform server in the foregoing embodiment.

It should be understood that, except exceptional cases clearly supported in the context, "a" ("a", "an", and "the") in a singular form used in the specification is intended to also include a plural form. It should be further understood that, "and/or" used in the specification refers to including any and all possible combinations of one or more items that are associatively discussed.

The sequence numbers of the above embodiments of the present application are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present application, but are not intended to limit the present application. Any modification, equivalent replacement, or improvement made within the spirit and principle of the present application shall fall within the protection scope of the present application.

What is claimed is:

1. A method for delivering messages performed at a server having one or more processors, memory for storing a plurality of programs to be executed by the one or more processors, the plurality of programs including a social networking application enabling message exchanges between user accounts, the method comprising:
    receiving a group-sending interface invocation request sent by a target user account, the group-sending interface invocation request carrying a to-be-sent message and at least one group identifier associated with the target user account, a follower group corresponding to each group identifier comprising a user account of at least one follower of the target user account, and the target user account being a user account that a service provider applies for to the social networking application;
    obtaining one or more sets of message delivery parameters, each set of message delivery parameters corresponding to a respective follower group of the target user account;
    determining a message delivery schedule for each client terminal corresponding to a user account in a respective follower group according to the set of message delivery parameters of the follower group and a user profile of the user account; and
    invoking, according to the group-sending interface invocation request, a message group-sending interface to send the message to a client terminal corresponding to a user account in a follower group corresponding to each of the at least one group identifier in accordance with a corresponding message delivery schedule.

2. The method according to claim 1, wherein the operation of invoking, according to the group-sending interface invocation request, a message group-sending interface to send the message to a client terminal corresponding to a user account in a follower group corresponding to each of the at least one group identifier further comprises:
    when the message comprises a message content identifier, invoking, according to the group-sending interface invocation request, the message group-sending interface to obtain a message content corresponding to the message content identifier, wherein the message content is any one of an image-text message content, a voice message content, a music message content, an image message content, and a video message content; and
    sending the message content to the client terminal corresponding to the user account in the follower group corresponding to each of the at least one group identifier.

3. The method according to claim 2, further comprising:
    before the operation of receiving a group-sending interface invocation request sent by a target user account:
    receiving an uploading interface invocation request sent by the target user account, wherein the uploading interface invocation request carries a message content to be uploaded;
    invoking, according to the uploading interface invocation request, a message content uploading interface to store the message content, and generating a message content identifier corresponding to the message content; and
    sending the message content identifier to the target user account.

4. The method according to claim 1, further comprising:
    after the step pf receiving a group-sending interface invocation request sent by a target user account:
    receiving a deletion interface invocation request sent by the target user account, wherein the deletion interface invocation request carries a message identifier corresponding to the message, and the message identifier is generated after the open platform server receives the group-sending interface invocation request and is sent to the target user account; and
    invoking, according to the deletion interface invocation request, a message deletion interface to delete the message.

5. The method according to claim 1, further comprising:
    after the operation of receiving a group-sending interface invocation request sent by a target user account:
    obtaining a sending status of the message;
    generating a sending status notification, wherein the sending status notification comprises a message identifier and the sending status that correspond to the message; and
    sending the sending status notification to the target user account.

6. The method according to claim 1, further comprising:
    before the operation of receiving a group-sending interface invocation request sent by a target user account, further comprising:
    receiving a preview interface invocation request sent by the target user account, wherein the preview interface invocation request carries the message and the target user account; and
    invoking, according to the preview interface invocation request, a preview interface to send the message to a client corresponding to the target user account.

7. The method according to claim 1, wherein the set of message delivery parameters includes a location-based message delivery parameter for determining a message delivering schedule based on a physical location of a client terminal corresponding to a user account in a follower group and a time-based message delivery parameter for determining a message delivering schedule based on a time zone of a client terminal corresponding to a user account in a follower group.

8. The method according to claim 1, wherein the set of message delivery parameters includes a subset of group-level message delivery parameters, multiple subsets of sub-group-level message delivery parameters, and individual user account-level message delivery parameters.

9. An open platform server, comprising:
    one or more processors;
    memory; and
    a plurality of programs stored in the memory and to be executed by the one or more processors, the plurality of programs including a social networking application enabling message exchanges between user accounts that, when executed by the one or more processors, causes the open platform server to perform a plurality of operations including:
    receiving a group-sending interface invocation request sent by a target user account, the group-sending interface invocation request carrying a to-be-sent message and at least one group identifier associated with the target user account, a follower group corresponding to each group identifier comprising a user account of at least one follower of the target user account, and the target user account being a user account that a service provider applies for to the social networking application;

obtaining one or more sets of message delivery parameters, each set of message delivery parameters corresponding to a respective follower group of the target user account;

determining a message delivery schedule for each client terminal corresponding to a user account in a respective follower group according to the set of message delivery parameters of the follower group and a user profile of the user account; and invoking, according to the group-sending interface invocation request, a message group-sending interface to send the message to a client terminal corresponding to a user account in a follower group corresponding to each of the at least one group identifier in accordance with a corresponding message delivery schedule.

10. The open platform server according to claim 9, wherein the plurality of operations further include:

when the message comprises a message content identifier, invoking, according to the group-sending interface invocation request, the message group-sending interface to obtain a message content corresponding to the message content identifier, wherein the message content is any one of an image-text message content, a voice message content, a music message content, an image message content, and a video message content; and sending the message content to the client terminal corresponding to the user account in the follower group corresponding to each of the at least one group identifier.

11. The open platform server according to claim 10, wherein the plurality of operations further include:

receiving an uploading interface invocation request sent by the target user account, wherein the uploading interface invocation request carries a message content to be uploaded;

invoking, according to the uploading interface invocation request, a message content uploading interface to store the message content, and generating a message content identifier corresponding to the message content; and sending the message content identifier to the target user account.

12. The open platform server according to claim 9, wherein the plurality of operations further include:

receiving a deletion interface invocation request sent by the target user account, wherein the deletion interface invocation request carries a message identifier corresponding to the message, and the message identifier is generated after the open platform server receives the group-sending interface invocation request and is sent to the target user account; and invoking, according to the deletion interface invocation request, a message deletion interface to delete the message.

13. The open platform server according to claim 9, wherein the plurality of operations further include:

obtaining a sending status of the message;

generating a sending status notification, wherein the sending status notification comprises a message identifier and the sending status that correspond to the message; and sending the sending status notification to the target user account.

14. The open platform server according to claim 9, wherein the plurality of operations further include:

receiving a preview interface invocation request sent by the target user account, wherein the preview interface invocation request carries the message and the target user account; and invoking, according to the preview interface invocation request, a preview interface to send the message to a client corresponding to the target user account.

15. The open platform server according to claim 9, wherein the set of message delivery parameters includes a location-based message delivery parameter for determining a message delivering schedule based on a physical location of a client terminal corresponding to a user account in a follower group, a time-based message delivery parameter for determining a message delivering schedule based on a time zone of a client terminal corresponding to a user account in a follower group.

16. The open platform server according to claim 9, wherein the set of message delivery parameters includes a subset of group-level message delivery parameters, multiple subsets of subgroup-level message delivery parameters, and individual user account-level message delivery parameters.

17. A non-transitory computer storage medium storing a plurality of computer executable instructions, the computer executable instructions being used by a server having one or more processors, wherein the computer executable instructions cause the server to:

receive a group-sending interface invocation request sent by a target user account, the group-sending interface invocation request carrying a to-be-sent message and at least one group identifier associated with the target user account, a follower group corresponding to each group identifier comprising a user account of at least one follower of the target user account, and the target user account being a user account that a service provider applies for to the social networking application;

obtain one or more sets of message delivery parameters, each set of message delivery parameters corresponding to a respective follower group of the target user account;

determine a message delivery schedule for each client terminal corresponding to a user account in a respective follower group according to the set of message delivery parameters of the follower group and a user profile of the user account; and invoke, according to the group-sending interface invocation request, a message group-sending interface to send the message to a client terminal corresponding to a user account in a follower group corresponding to each of the at least one group identifier in accordance with a corresponding message delivery schedule.

* * * * *